(12) United States Patent
Andreas et al.

(10) Patent No.: US 10,276,160 B2
(45) Date of Patent: Apr. 30, 2019

(54) AUTOMATED ASSISTANT FOR USER INTERACTION VIA SPEECH

(71) Applicant: Semantic Machines, Inc., Newton, MA (US)

(72) Inventors: Jacob Daniel Andreas, Berkeley, CA (US); Taylor Darwin Berg-Kirkpatrick, Berkely, CA (US); Pengyu Chen, Cupertino, CA (US); Jordan Rian Cohen, Kure Beach, NC (US); Laurence Steven Gillick, Newton, MA (US); David Leo Wright Hall, Berkeley, CA (US); Daniel Klein, Orinda, CA (US); Michael Newman, Somerville, MA (US); Adam David Pauls, Berkeley, CA (US); Daniel Lawrence Roth, Newton, MA (US); Jesse Daniel Eskes Rusak, Somerville, MA (US); Andrew Robert Volpe, Boston, MA (US); Steven Andrew Wegmann, Berkeley, CA (US)

(73) Assignee: Semantic Machines, Inc., Newton, MA (US)

( * ) Notice: Subject to any disclaimer, the term of this patent is extended or adjusted under 35 U.S.C. 154(b) by 0 days.

(21) Appl. No.: 15/348,228

(22) Filed: Nov. 10, 2016

(65) Prior Publication Data

US 2017/0140755 A1 May 18, 2017

Related U.S. Application Data

(60) Provisional application No. 62/254,438, filed on Nov. 12, 2015.

(51) Int. Cl.
*G06F 17/27* (2006.01)
*G10L 15/22* (2006.01)
(Continued)

(52) U.S. Cl.
CPC ............ *G10L 15/22* (2013.01); *G06F 17/241* (2013.01); *G06F 17/248* (2013.01);
(Continued)

(58) Field of Classification Search
CPC ....................................................... G06F 17/02
(Continued)

(56) References Cited

U.S. PATENT DOCUMENTS 4,887,212 A   12/1989   Zamora et al.
5,479,563 A   12/1995   Yamaguchi
(Continued)

FOREIGN PATENT DOCUMENTS

WO   2014197635   12/2014

OTHER PUBLICATIONS

Zhu, Su, Lu Chen, Kai Sun, Da Zheng, and Kai Yu. "Semantic parser enhancement for dialogue domain extension with little data." In Spoken Language Technology Workshop (SLT), 2014 IEEE, pp. 336-341. IEEE, 2014.
(Continued)

*Primary Examiner* — Jesse S Pullias
(74) *Attorney, Agent, or Firm* — Alleman Hall Creasman & Tuttle LLP

(57) ABSTRACT

An interaction assistant conducts multiple turn interaction dialogs with a user in which context is maintained between turns, and the system manages the dialog to achieve an inferred goal for the user. The system includes a linguistic interface to a user and a parser for processing linguistic events from the user. A dialog manager of the system is configured to receive alternative outputs from the parser, and selecting an action and causing the action to be performed based on the received alternative outputs. The system further includes a dialog state for an interaction with the user, and the alternative outputs represent alternative transitions from
(Continued)

a current dialog state to a next dialog state. The system further includes a storage for a plurality of templates, and wherein each dialog state is defined in terms of an interrelationship of one or more instances of the templates.

20 Claims, 2 Drawing Sheets

(51) Int. Cl.
  *G06F 17/24* (2006.01)
  *G10L 15/06* (2013.01)
  *G10L 15/18* (2013.01)
  *G10L 25/51* (2013.01)
  *G10L 15/26* (2006.01)

(52) U.S. Cl.
  CPC .......... *G06F 17/279* (2013.01); *G10L 15/063* (2013.01); *G10L 15/1822* (2013.01); *G10L 15/26* (2013.01); *G10L 25/51* (2013.01); *G10L 2015/223* (2013.01)

(58) Field of Classification Search
  USPC ................... 704/231–257, 270–275, 1, 9, 10
  See application file for complete search history.

(56) References Cited

U.S. PATENT DOCUMENTS

| | | | |
|---|---|---|---|
| 6,647,363 B2 | 11/2003 | Claassen | |
| 6,810,375 B1 | 10/2004 | Ejerhed | |
| 6,829,603 B1 | 12/2004 | Chai et al. | |
| 7,716,056 B2 | 5/2010 | Weng et al. | |
| 9,189,742 B2 | 11/2015 | London | |
| 9,286,892 B2 | 3/2016 | Mengibar et al. | |
| 9,318,109 B2 | 4/2016 | Boies et al. | |
| 2002/0042707 A1* | 4/2002 | Zhao | G06F 17/27 704/9 |
| 2003/0130849 A1* | 7/2003 | Durston | G10L 15/22 704/270 |
| 2005/0075878 A1 | 4/2005 | Balchandran et al. | |
| 2006/0271364 A1* | 11/2006 | Mirkovic | G06F 17/28 704/239 |
| 2008/0140389 A1* | 6/2008 | Funakoshi | G06F 17/2785 704/9 |
| 2010/0299136 A1* | 11/2010 | Tong | G06F 17/279 704/9 |
| 2012/0209594 A1* | 8/2012 | Agarwal | H04M 3/4931 704/9 |
| 2015/0142704 A1* | 5/2015 | London | G06N 5/04 706/11 |
| 2016/0070695 A1 | 3/2016 | Gandrabur et al. | |

OTHER PUBLICATIONS

"Non Final Office Action Issued in U.S. Appl. No. 15/896,738", dated May 7, 2018, 12 Pages.

* cited by examiner

AUTOMATED ASSISTANT FOR USER INTERACTION VIA SPEECH

CROSS-REFERENCE TO RELATED APPLICATIONS

This application claims the benefit of U.S. Provisional Application No. 62/254,438, filed Nov. 12, 2015, titled "AN ATTENTIVE COMMUNICATION ASSISTANT." This application is incorporated herein by reference.

BACKGROUND

This invention relates to an interaction assistance system, and in particular to an automated assistant for a user interacting with a system using speech.

Previous automated dialog systems have been based on hand-constructed slot-filling applications. These are normally hand-tuned, and accept only a subset of the English language as input (this tends to make them difficult to use, and very hard to learn). Some such systems support mixed initiative, a mode in which machines collect additional information about the conversation from the user. More recently, Partially-Observable Markov Decision Process (POMDP) approaches have used partially hidden Markov processes to keep track of the state of the system, where the system keeps track of multiple states at each time, and the system acts on a best guess at each time. In such prior systems, the semantics of the processes have been hand coded, or encoded as a simple probabilistic process if the dialog is simple enough. Semantics are tied to meanings or actions of words and/or context.

In the area of telephone-based assistants, previous telephone assistants were not in general dialog agents, but were instead single utterance command/response systems. In a number of systems, the user can request either a piece of information or an action, and the system responds appropriately if the speech recognizer had been accurate and if the user had uttered a request from within the vocabulary of the system. However, in general, the systems were brittle, did not understand paraphrase, and did not carry context across sessions, and mostly did not carry context even within an interaction session.

SUMMARY

In one aspect, in general, an interaction assistant conducts multiple turn interaction dialogs with a user in which context is maintained between turns, and the system manages the dialog to achieve an inferred goal for the user. The system includes an integration section that includes a first integration component for providing a linguistic interface to a user. The system also includes an event processing section including a parser for processing linguistic events from the first integration component. A dialog manager of the system is configured to receive alternative outputs from the event processing section, and selecting an action and causing the action to be performed based on the received alternative outputs. The system further includes a storage for a dialog state for an interaction with the user, and wherein the alternative outputs from the event processing section represent alternative transitions from a current dialog state to a next dialog state. The system further includes a storage for a plurality of templates, and wherein each dialog state is defined in terms of an interrelationship of one or more instances of the templates.

In another aspect, in general, a method is used for determining parameter values for a plurality of components of an interaction system. The system is configured to process sequences of events, the events including linguistic events and application related events, the processing of events including parsing of linguistic events, determining a sequence of dialog states, and determining a sequence of output actions from sequence of events corresponding to the sequence of dialog states. The method includes collecting a plurality of sequences of events and corresponding sequence of output actions. An iteration is repeated. Each iteration includes processing a sequence of events and a corresponding sequence of output actions by processing the sequence of events using current parameter values of the system, the processing including determining a sequence of dialog states from the sequence of events. A sequence of output actions is determined from the sequence of dialog states. A comparison of the determined sequence of output actions and the collected sequence of output actions is used to update parameter values of the plurality of components of the system. The repeating of the iterations is completed upon reaching of an ending conduction. The parameter values for the plurality of components of the system are set using a result of the iterations.

An advantage of one or more embodiments is that use of templates from which the dialog states are defined permits use of a large set of possible dialog states without requiring explicit specification of those states. Furthermore, the structure of the system enables efficient and effective determination of parameter values ("training") of machine learning and neural network components.

Other features and advantages of the invention are apparent from the following description, and from the claims.

DESCRIPTION

Figure 1:
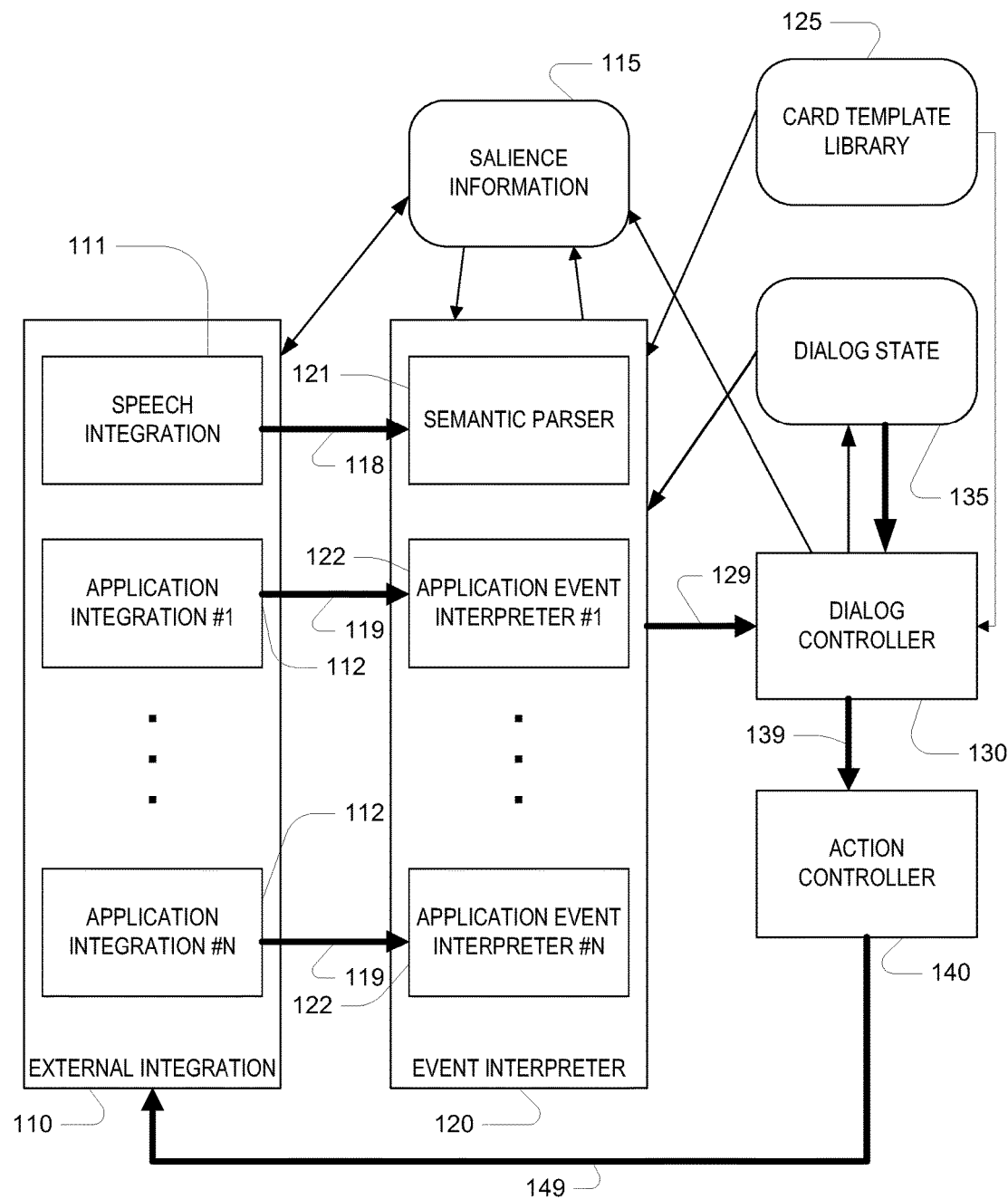
FIG. 1 is a block diagram of an interaction assistance system.

FIG. 1 is a block diagram on an interaction assistance system 100, which is configured to interact with a user in multiple-turn dialogs, for example, to accomplish tasks initiated by the user. One example of such a task may be ordering of a pizza through a voice interaction in the system; however it should be understood that a substantially broader set of types of tasks may be handled by the system.

The system includes an external integration section 110, which generally provides a direct communication interface with a user and external applications or systems associate with (e.g., controlled by or interacting with) the user. One form of direct communication with the user, which is discussed in detail below makes use of a speech integration component 111 that includes an automatic speech recognizer and a speech synthesizer enabling the system to directly communicate with the user by voice, for example, over a telephone or other remote connection or over a local microphone and speaker. Other forms of direct communication, generally each with a separate component of the external integration section 110 not shown in FIG. 1, may provide, for instance, text-based direct communication with a user, direct graphical user interface (GUI) interaction. The external interface section optionally includes application integration components 112. An example of an external applications for which the components 112 provide integration includes an email application or a web browser application, for example, enabling the system to send and receive email messages, and interact with web sites to obtain or provide information.

The components 111, 112 of the external integration section generate events, which are processed through the system 100. For instance, the speech integration component 111 may provide an automatically computed transcription of an utterance spoken by the user. The system includes an event interpreter section 120, which includes individual event interpreters 121, 122 such that each component 111, 112 of the external integration section 110 passes its events to a corresponding component 121, 122 of the event interpreter section, for example but not necessarily, with each component of the event interpreter section 120 handing events for a different component of the external integration section 110. For voice-based input from the user, the speech integration component 111 passes the result of automated speech recognition (e.g., a word transcription, N-best transcriptions, a word lattice, etc.) to a semantic parser component 121 of the event interpreter.

One aspect of the system 100, which aids in processing by components of the event interpreter section 120, is the maintenance of information, referred to herein as salience information 115. For example, this information provides contextual information that the system uses in interpreting the user's utterances, in resolving implicit references in the user's input, and in resolving logical conditions during processing of an event. Some of the salience information may be relatively static, for example, representing the user's home address and telephone number. Such information may be used to provide address information to achieve a goal, possibly eliciting an explicit confirmation from the user. Some salience information may be much more transient, for example, having been determined by previous input in the same dialog or determined according to a synthesized text output of the dialog. In a very simple example, such information may be used to resolve words in a user's input such as "it." There may be multiple sources of the information in the salience information section 115, including directly from components of the external integration section 110, from components of the event interpreter section, as well as from a dialog controller 130, which is described further below. The information in the salience information section 115 may also be used, for example, by the external integration section. For example, the salience information may aid in text generation for text- or voice-based output to the user.

Another aspect of the system 100, which is important to the manner in which the components of the event interpreter 120 operate relates to the use of "cards" that are defined in a card template library 125, and the maintenance of a dialog state 135, which is specified in terms of these cards. As is discussed in more detail below, for each event 118, 119 received by the event interpreter section 120 from the external integration section 110, the event interpreter section provides a set of proposed "plans" 129. Generally, a plan specifies a transition from one dialog state to another dialog state, generally from the current dialog state 135 to another state that is a modification of that current state. Such modifications may include addition of cards to the graph, replacement of a card with another card, or rearrangement of the existing cards in the graph. In addition, a plan specifies one or more actions associated with the transition, generally with the new state of the plan designating that those actions have been performed. For example, an action may cause the system to dial a phone number, to send an email, to read some text to the user, or to ask a question of the user (such as "who is the email to?"). Generally, the event interpreter section 120 does not attempt to make a final decision regarding the next state—that decision is deferred to the dialog controller 130, which receives the proposed plans 129 and selects a plan and initiates the associated action or actions to be performed.

Processing of an event 118, 119 proceeds with the event interpreter section 120 providing the set of proposed plans to the dialog controller 130. The dialog controller may also receive further proposed plans from the dialog state 135, essentially as autonomously generated possible transitions based only on the dialog state without consideration of the current input event. The dialog controller selects the next dialog state 135. Associated with the selected next dialog state, the dialog controller also determines an action 139 (or more generally one or more actions) associated with the plan that results in the next dialog state, and it instructs an action controller 140 to effect that plan. For example, the action may be to solicit an input from the user by issuing a prompt requesting certain information that is needed to complete the task. The action controller 140 interacts with a component of the external integration 110 to effect the action. For example, the speech integration component 111 may generate text and synthesize that text for presentation by voice to the user, at the command of the action controller 140. Generally, this cycle of event processing continues for multiple interactions ("turns") with the user until a task is completed.

An aspect of the system is that all possible structures for dialogs do not have to be predetermined. Rather, the structure of a dialog is determined during runtime based on the set of card templates that are defined in card template library 125, which in general have been authored manually. As discussed more fully below, in general, a card has an output of a predefined type, and a number of fields, each of a predefined type. Values of these fields can be thought of as inputs, which define the output of the card.

Figure 2:
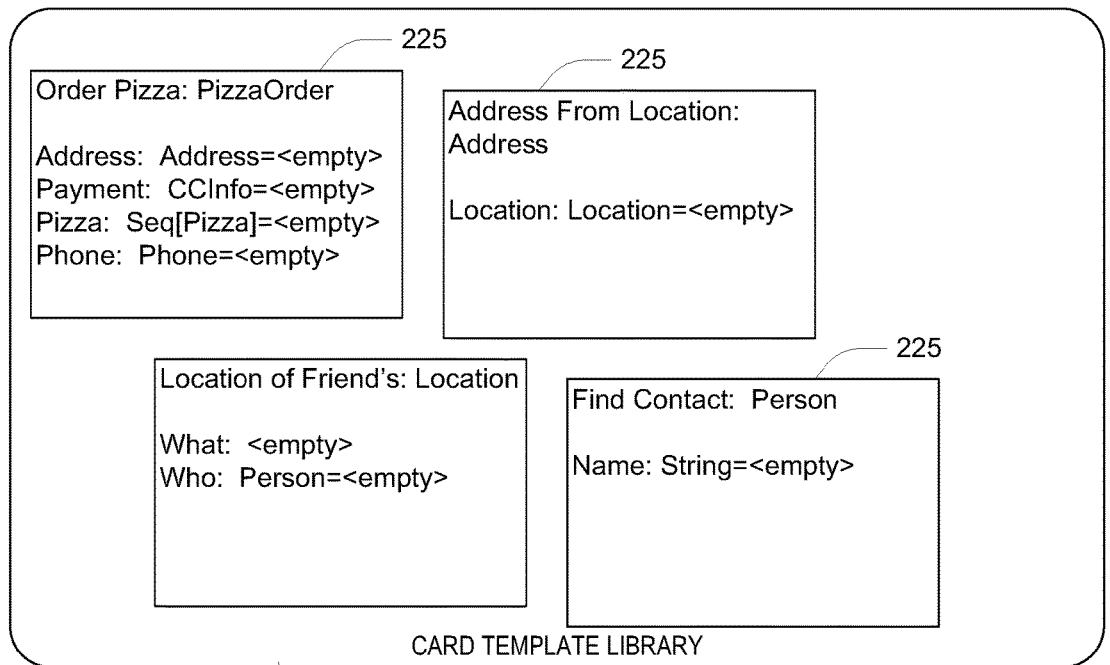
FIG. 2 is a diagram illustrating a card library.

Referring to FIG. 2, an example of a card library 125 includes a number of card templates 225. As illustrated in FIG. 2, four cards are shown, which are related to a pizza ordering domain. One card, named "Order Pizza" has an output of a predefined type "PizzaOrder". This card has four fields, which together provide sufficient information to characterize a pizza order. An "Address" field, of predefined type "Address" provides the delivery address for the order; a "Payment" field, of a predefined type "CCInfo" (i.e., credit card information) provides the credit card payment details for the order; a "Pizza" field, which is a set (or sequence) of items of a predefined type "Pizza" provides the details of the order itself; and finally a "Phone" field of a predefined type "Phone" (i.e., a telephone number) provides a number from which the order was placed.

In general, each data type has one or more cards that can provide an output value of that data type. As illustrated in FIG. 2, a "Location of Friend's" card provides an output of type "Location". For example, if the user is ordering a pizza to be delivered to his friend John's house, the "Location of Friend's" card may be used to determine where to deliver the pizza that the user is ordering.

Figure 3:
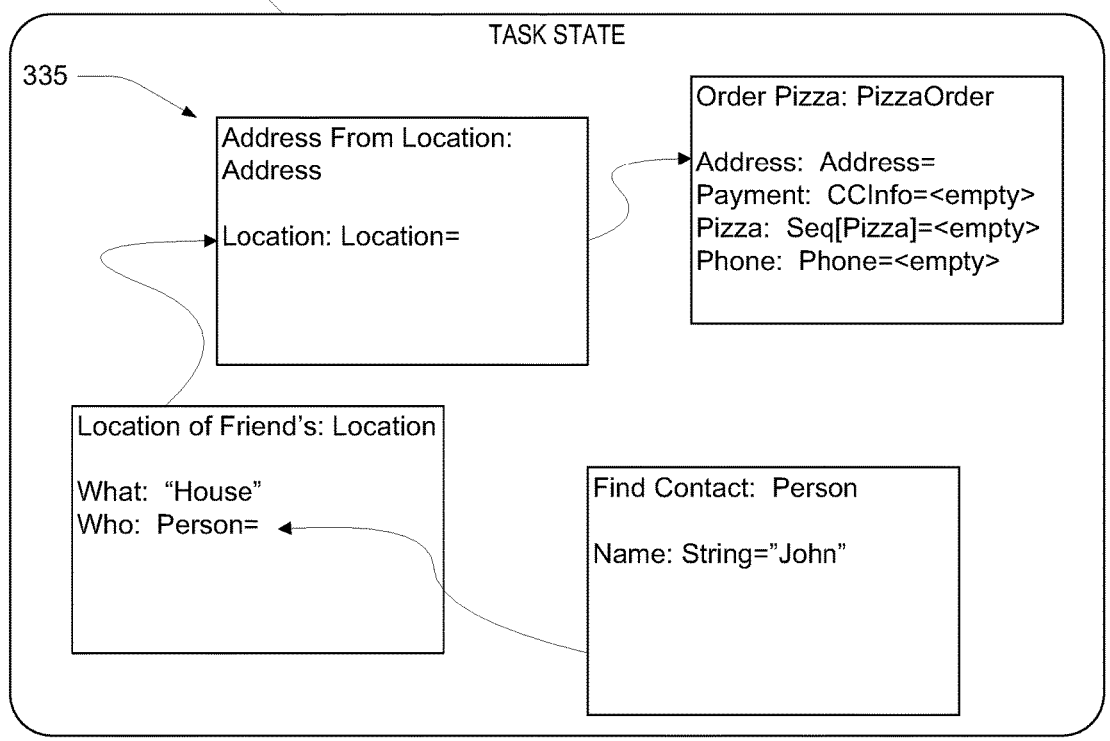
FIG. 3 is a diagram illustrating a dialog graph.

Referring to FIG. 3, a dialog state 135 may be represented a dialog graph 335 that represents a state of an interaction. The nodes of the graph correspond to instances of cards from the card library 125, and directed links each from an output of one card to one or more inputs of other cards. As an exemplary dialog graph 335, a root node of the graph is an instance of the "Order Pizza" card. In the state shown in FIG. 3, the "Address" input of the "Order Pizza" card is linked to an "Address from Location" card, and the "Location" input of that card id linked to an instance of the "Location from Friend's" card introduced above. Finally, the "Who" input of the "Location from Friend's" card is linked to a "Person" card. Although many different utterances, or multiple turns of interaction between the user and the system, could lead to this dialog graph, one utterance could be user: "I'd like to get a pizza delivered to John's house"

or user: "order pizza"
system: "where should it be delivered?"
user: "to John's"
system: "John's house or his office?"
user: "his house".

Note that at any point of time, the dialog graph 335 may be ambiguous, for example, with multiple cards potentially providing input values to a card or there being multiple root cards. The dialog state 135 may be equivalently represented as a nesting of the card instances, with the value of an input of one card instance being represented as a nest card instance, for example, with the "Address" input of the "Order Pizza" card instance being a nested "Address from Location" card instance. However, it should be understood that the particular way of representing dialog state using the set of card instances is not critical.

Turning to the processing of linguistic input by the system, of which speech input is one example (in addition to text input), as introduced above, the external integration section 110 includes a speech integration component 111, which provides automatically processed speech input 118 (i.e., linguistic input) to a semantic parser 121 of the event interpreter section 120. The output of the speech recognizer is in the form of text (or other representation of word sequences), and may represent alternative interpretations of the speech input in the form of an N-best list or a lattice representing a set of possible word sequences.

The sematic parser 121 makes use of the salience information 115 and the card templates 125 in processing the output of the speech recognizer 110. In general, for each input utterance from the user, the parser determines whether field values of particular cards and references to new cards are represented in the input. The output of the semantic parser is passed to a dialog controller 130, which determines how to guide the interactions with the user based on the information known at that time, including the salience information 115. It is the dialog controller 130 that maintains the dialog graph 335 that represents the overall goal as well as dependent sub-dialogs or sub-goals.

Two important aspects of the system are the way in which the dialog graph is constructed during interaction with the user, and how the dialog graph is used to guide the interaction with the user, for example, in order to elicit information needed to determine variables in the graph either as an explicit value or by instantiating a card whose output provides a value.

The construction of the dialog graph depends significantly on the operation of the semantic parser, which can detect instances of user input that map to particular cards. To aid this process, in general, each card has associated with it a specification of a classifier or trigger definition (e.g., a list of trigger phrases) that are used by the semantic parser when interpreting a user's input. As discussed further below, such classifiers or trigger phrases may be authored manually, for example, by a system designer who adds a card to the card library. Preferably, the system learns the classifier through a process that make use of training data that pairs user inputs with valid interpretations.

Generally, the semantic parser 121 interprets user utterances to produce representations of intentions, and passes these to the dialog controller 130, which processes these representations of intentions to maintain a dialog state, including the dialog graph 135 introduced above. Generally, the semantic parser processes the text input 118 making use of the salience information 115, for example, to resolve references to entities, for instance, "it", "the email", "Dan's email", "Dan Klein's email", "the email about TTS", etc. It looks at the current salience of the entity in question, and other similar entities that are salient as well, and decides the correct referring expression. As introduced above, the parser also identifies card templates that are references in an input, and fills in information from the input and from the salience for those identified cards. The parser also has access to the current dialog state 135, which represents part of the task state, and provides values that may be needed to fill in already instantiated cards in the dialog state. The parser also updates the salience information 115 with entities that it finds in an utterance, whether or not that information is pertinent to new card or an already instantiated card in the dialog state.

The sematic parser 121 in this embodiment is a hypergraph weighted deduction system (see, e.g., Pauls, A. D., "Optimal Search Algorithms for Structured Problems in Natural Language Processing," *Ph.D. Thesis, EECS Department, University of California, Berkeley,* 2012). Such a parser starts from an initial set of "items" called "axioms," and uses "deduction rules" to combine items into larger items in order to produce one or more goal items, which represent "complete" interpretations of the utterance. The semantic parser 121 has two kinds of items. The first is an "homed" item that describes both a card and its location in the dialogue manager's cards graph. Another is an "orphaned" item that is a card without a location in the graph. All homed items are considered goal items.

For axioms, this parser uses information from the output of the automatic speech recognizer 110, the task state including the dialog graph 135, and the salience 115. All (homed) cards of the current task graph are produced as axioms. In addition, the parser uses the ASR transcript (or lattice) to produce (orphaned and homed) cards that are triggered by certain keywords, combinations of keywords, or extra information introduced by other systems or dictionaries such as the salience state. For instance, the utterance "send the same message to john smith" might trigger a "send-email" axiom, a "send-text-message" axiom, a "resolve-contact(John Smith)" axiom, and an axiom representing the most salient message.

For deduction rules, the parser then considers ways of combining items into larger items by connecting cards to one another. For instance, the parser might take the card representing the most salient message and replace its "addressee" sub-card with "resolve-contact(John Smith)". If the most salient message is an email, then "send-email" and the item representing the readdressed message can combine; otherwise "send-text-message" and the message will.

Note that in general there is no constraint that every axiom be used nor that every word in the transcript or time span in the lattice be "covered" by axioms used in the parse. For example, a perfectly valid (but incorrect) parse might simply be "send-email(message=most-salient-message)" without having replaced the addressee field as above. Indeed, every homed parse item proposed by the parser could be considered a "complete" parse. Many of them are merely wrong.

To choose between good and bad parses, the parser assigns scores to items using a pre-specified function. This function could be designed by hand, or estimated with machine learning using a linear classifier or neural network, as discussed further in this document.

The sematic parser combines information from the current dialog state determined prior to the user's utterance with the text of the utterance itself to produce a parse. This feature enables contextual interpretation: the parser might correctly infer that the word "message" means a "text message" in one context, while it might mean "email message" in another. Without knowledge of the context, the semantic parser might have no way of knowing which analysis is more correct. Unlike previous semantic parsers that normally process only with one input utterance at a time, the semantic parser of this system considers the salience information and current dialog state to inform some decision process of the intent of the user. In the current system, the semantic parse considers the salience of the cards being acted upon, the identities of those cards and other cards indicated by the task, and the output actions and output utterances of the agent when deciding how to interpret the user's speech.

To review the function of the semantic parser 121, it uses and updates the salience information based on an interpretation of the text input 118 from the speech integration component 111, and also uses the current dialog state 135, and produces information that it passes to the dialog controller 130. In processing its input, the sematic parser is also configured with rules or other information associated with particular card templates of the template library, thereby permitting it to detect instances of text that corresponding to instances of the cards, and is also configured to parse or detect instances of the known data types that are reference by the cards (i.e., as the inputs and outputs of the cards). The card template library therefore provides a way of extending the domain of the system without requiring modification of the semantic parser or other components of the system. Note that the separation of specification of cards and configuration of the semantic parser permits extension of the system to new tasks by authoring new cards, without necessarily having to modify the semantic parser itself.

Turning now to operation of the dialog controller 130, the function of the dialog controller, is after each event input, essentially to decide what to do next (i.e., it is the "decider"). Given a set of candidate plans (proposed by the semantic parser 121 and/or autonomously from the cards of the dialog state), the dialog manager chooses which of those plans it should select and execute its actions. However, it should be understood that the dialog manager may choose to do nothing, to ask whether it should execute a particular plan, to ask the user which of several plans it should execute. These alternatives can also be formulated as plans, by using a "do nothing" card, a "confirm" card, a "choose" card, or a "ask-for-help" card. The dialog manager adds these alternative plans to the pool of candidate plans and scores them alongside the other proposes plans.

Thus, the dialog manager 130 has three responsibilities. First, it ranks the proposed plans according to a score function. Then, it adds new candidate plans along with scores for those plans. Finally, it chooses the best scoring plan. The score function for a plan may either be constructed by hand or using machine learning. The machine-learning algorithm can be any structured classifier or ranking algorithm, such as a structured support vector machine.

Another aspect of the role of the dialog manager 130 is maintenance of the "focus" of the dialog state 135. As discussed above, the dialog graph 335 of the dialog state 135 is formed by an interconnection (or equivalently nesting) of instances of cards. The dialog manager identifies one of these cards as the focus of the dialog. This focus card may be the card for which an action is invoked. The identification of the focus is then useful, for example, for the semantic parser in interpreting an input even that may result from the action.

Continuing to consider the case of linguistic input and output, certain actions selected by the dialog manager involve generation of text, and in the case of voice output, synthesis of an acoustic version of that text. The speech integration component 111 includes a text generator and a speech synthesizer, which receives the output of the text generator and provides an output for presentation audio.

When card designers specify linguistic information for output, they may do so using a simple logical form describing the message, rather than writing strings directly. This logical form is then rendered as a string by the text generator. Centralizing the generation mechanism provides two primary benefits. First, the card implementer doesn't need to know about the rules of grammar, proper pronoun use, etc. Second, it is easy to automatically introduce variation in the language, making interaction between the user and the system more natural ("would you like to send John an email", "would you like to send an email to John?").

Logical forms may either describe properties of the entities being discussed (e.g., the sender or subject of an email, for example) or the tasks in the dialogue (e.g. asking whether the system should read a newly-received email before finishing the current task). In one possible embodiment, logical forms are implemented as key-value pairs corresponding to a simple neo-Davidsonian semantics, with every node designated as a top-level dialogue act, event, entity, or attribute, and additional keys providing additional elaboration (the participants in an event, the name of an entity, etc.). Finally, portions of this logical form corresponding to pieces of the current dialogue state (cards or entities) are tagged with appropriate identifiers.

For example, the dialogue agent might express its intent to send an email with the subject "power line report" as:

```
{
  type: InformIntention
  body: {
    type: event
    name: send
    agent: DialogueAgent
    id: card###
    theme: {
      type: entity
      name: email
      subject: power line report
      id: email###
    }
  }
}
```

This logical form might be rendered in a number of ways:
I will send an email with subject "power line report".
I will send an email about the power line report.
I'm going to send the power line report email.
I'll send it.
etc.

As with the sematic parser 121, the text generator of the speech integration component 111 uses the salience information 115 to decide how to generate text from logical form. As can be seen in the example above, the system might describe the email in question with varying degrees of specificity depending on how salient it is relative to other emails.

For each logical form, the text generator produces a set of candidate utterances (realized either explicitly or as a packed forest). These candidates are generated recursively: given a logical form (or fragment thereof), the text generator may either have a rule for rendering the entire logical form as a string, or for realizing part of it using a template, which is then completed by realizing each subpart independently.

These rules may be written by hand, or extracted automatically from both structured and unstructured linguistic resources. As an example, for any given event, the text generator uses data from the OntoNotes corpus, as well as data collection from the Open Web and human annotators to choose a natural language rendition of the logical form. The OntoNotes corpus links each verb with its arguments, and embodiments of the system may use information to provide renderings of verbs paired with their arguments.

Given a set of candidate utterances, the text generator uses a scoring function to weight each utterance, and samples from them in proportion to their scores. Like the semantic parser, this function could be designed by hand, or estimated with machine learning using a linear classifier or neural network.

It should be understood that the description of processing of speech input and providing voice output is applicable to text-based input and output, with the exception that automatic speech recognition and speech synthesis are not required. Furthermore, processing of events from application integration components 112 by corresponding event interpreters 122 may directly feed proposed changes of dialog state by filling of values of existing cards of the dialog state 135 or by proposing plans with state changes that introduce instances of cards associated with the application events.

The procedures implemented by various components described above do not have to be entirely configured manually. Rather, although a number of components may have manually configured aspects, such as the association of a trigger phase with a card template, or the logical form of an output to the user, and operation of much of the system involves ranking or selection from a relatively limited set of alternatives. The ranking and selection of these alternatives may be configured using automated techniques using representative data of interactions between a user and the system.

In general, various known techniques of Machine Learning (ML) or use of Artificial Neural Networks (ANN) are used by the various components of the system (e.g., perceptrons, feed-forward systems, convolutional neural networks, long short term memory systems, attentional systems, structure classifier or ranking algorithm such as a support vector machine or other training algorithms, optimizing functions such as cross entropy, likelihood, probability, error rates, or other measures). Very generally, a training system takes all the inputs, outputs, and intermediate states of the system and optimizes the performance of the speech recognizer and text generator of the speech integration component 111, of the semantic parser 121, and of the dialog manager 130. The optimizations may be functions of cross entropy, likelihood, probability, error rates, or other measures.

One aspect of use of ML and ANN techniques is the need for "training data" representing desired outcomes. For example, in the case of the dialog manager, this training data may include an indication of a desirable plan to be selected based on the plans proposed by the semantic parser. One way the system determines such training data is in a "Wizard of Oz" (WoZ) mode. In this mode, the user is free to ask anything of the system, and a human agent forms the reply for the system to the best of his capability (or respond that some services are not available). This mode is meant for data collection and as an aid for later optimization with either automatic or manual assistants incorporated into the protocols.

In a "Human Operator" mode, a human does not form the reply for the system, but rather makes selections from options identified by the system. For example, the human operator may be presented with the top automated transcriptions determined by speech integration component and select the "best" one. Similarly, of the plans proposed by the semantic parser, the human operator may select the one that is most appropriate given the input and the current dialog state. The human operator's choices are recorded, and used to train automatic selection or scoring features for automated operation without the human operator in a fully automated mode.

Intermediate to the Human Operator mode and the fully Automated mode, a mixed Automatic/Human mode performs selection and scoring or alternative and in some cases proceeds without human intervention. However, if the automated selection or scoring indicates that there is a uncertainty or ambiguity in the automated procedure (e.g., because multiple options have similar scores), the human operator is enlisted to make the decision as in the Human Operator mode. These decisions are used to augment the training data for future training of the ML and ANN components.

Another source of training data is from human annotation of intermediate data in the system. For example, human experts may annotate correct parses of the semantic parse by hand, and train the parser to produce the same parse (perhaps using a loss function such as minimizing the number of incorrect sub-cards in the parse to enable partial credit).

In general, annotation of the intermediate data is not required. For example, the parse output by the semantic parser is treated as a "latent variable" that must be determined by finding a parse that, if acted upon (e.g., as the plan chosen by the dialog manager), would match the behavior of human agents. For example, the training data for such an approach may comprise the sequence of user utterances and events (for example, spoken utterances or the arrival of a new email), and the outputs are a sequence of actions corresponding to those events. An unsupervised training algorithm such as the EM algorithm (e.g. see A. P. Dempster, N. M. Laird, and D. B. Rubin. "Maximum Likelihood from Incomplete Data Via the EM Algorithm," *Journal of the Royal Statistical Society: Series* B, 39(1):1-38, November 1977) can be used to infer what parses (as well as dialog manager and action controller outputs) could produce the correct output sequence. Generally, separate parameters are trained in this manner for each component, such as for the speech integration component 111, the semantic parser 121, and the dialog manager 130.

An important component of such a training algorithm is the ability to handle "unexplained" human operator generated outputs and actions—that is, outputs that cannot be produced by any parse or action available to the system. Such outputs can be explained by providing special parses and actions that can explain any possible output, but whose use during training is heavily penalized so that normal parses and actions are preferred.

One approach to training a text generation part of the speech integration component make use of human experts who provide text corresponding to sample logical forms produced by the system. The text generator is trained to produce those outputs given the logical forms as inputs, perhaps using a loss function such as maximizing the BLEU (http://aclweb.org/anthology/P/P02/P02-1040.pdf) score of the generated text.

The semantic parser uses a number of features of the items for scoring or selecting output plans. These include:
1. The type of new cards created and how many are created.
2. The probability of trigger words according to the text input (possibly after having been rescored to account for salience).
3. The salience of cards and entities.
4. How many changes to existing cards are made.
5. The presence of discourse-informative words like "actually" (which indicate that the user wishes to change something) or "also" (which indicates the user wishes to add something).
6. How many words of the input utterance are used.
7. How many words are used multiple times.
8. For two items that are combined, how far apart their trigger words (if any) are in the input utterance.
9. An action model that scores parses by how frequently they occur in data collected from hero-agent interactions (refer to discussion about data collection presented elsewhere herein), possibly conditioned on previous actions. In the described embodiment, the action model is an n-gram language model over actions instead of words.

The system may be trained using direct or indirect supervision. With direct supervision, the system receives training data in the form of a list of candidate plans (including a correct plan) and a dialogue context, and it is trained to select the correct plan.

One way to collect this data is with the human-operator mode, where the system continuously proposes ranked lists of plans, and the human can select one of the candidates, or reject all candidates. Similarly, in mixed mode, the system may elect to defer to a human agent for help based on a confidence threshold (such as when several plans have similar scores) or another mechanism. The human's choice can be remembered as training data.

The dialog manager can also be trained given indirect supervision using the same latent variable approach described for training the semantic parser. Another, even more indirect form of supervision is to learn from end user interactions without the direct intervention of a human operator. In this mode the system acts as a reinforcement learning agent, where it looks for cues ("rewards") that it has performed a correct or incorrect action. When it does so, the system updates the score function's weights to be less likely to make the mistake again. These cues may be explicitly provided by the user (for instance by saying a predesignated keyphrase, shaking the phone, or pressing a button), or implicitly such as measuring the user's frustration level by acoustic properties of their speech. The learning algorithm can be any reinforcement learning algorithm, such as Q-learning, Deep-Q networks, or temporal difference learning.

In addition to the approaches to training described above, it is possible to train the components of the system in an integrated manner either offline from data collected from interactions with users (referred to as trace data) or online while a dialog is ongoing. When training from trace data, the system takes complete or ongoing call logs, including any annotations, as input and updates its weights to make its predictions the same as those presented by the call logs. For the purposes of this section, the logs could include:
1. speech recognition transcript of the user's speech, including lattices or k-best lists if available.
2. if the human agent provides voice output, speech recognition transcript for the agent.
3. application events, including application events (e.g., selection of items in a graphical interface, DOM (Document Object Model) events, HTTP requests, etc.), and metadata capture from applications and device (e.g., time, location, vehicle speed, etc.).
5. textual or structured annotations added by an agent or other annotator after the fact.

All of this data is time-aligned: each event is accompanied by its start and end time. Training configures the system to predict the trace data, for example, using unsupervised or reinforcement learning techniques. One approach is based on generative probabilistic models.

Referring back to FIG. 1, the training may be considered to be a sequence of events 118, 119 generated by components of the external integration section 110 and resulting correct actions 139, which may be generated by the dialog controller 130, in response to those events. Configurable parameters, such as parameters for ranking parses in the semantic parser 121 or for ranking plans by the dialog controller 130, are optimized to best match the events and the actions, without necessarily requiring annotation of evolution of the dialog state or other internal aspects of the processing of the events. In some examples, in addition to optimizing the parameters of components of the event interpreter 120 and of the dialog controller, parameters of the speech integration component 111 (e.g., automatic speech recognition, and text-to-speech synthesis) may also be optimized by considering the events that are paired to the actions to be original inputs, such as the original input speech, rather than the events produced from the events.

Generally, the approach to training involves using an input that is a collection of training examples, where each training example is a sequence of the events described in the bulleted list, plus any metadata. The card library corresponding to the collection of training examples is also used. Parameters for all models to be trained (e.g. parser, agent/dialogue manager, text generation, automatic speech recognition or synthesis) are first initialized, for example, as random or zero numerical vectors of parameters. In some cases, parameters may be initialized to values that are informed with default conditions, such as specifying aspects such as "don't confirm all the time" or "parser should use most words in the sentence".

The determination of the parameters of the various components is then performed iteratively until a stopping condition, such as convergence of the values of parameters or a limit on the number of iterations. For each training example (or a "minibatch" of a set of training examples), the input events are processed using the current parameters, and the best weighted execution trace is chosen. For each decision associated with that best trace, if the chosen choice with the current model parameters is inferior to the best choice, the parameters are incremented according to a learning rate and a difference between the chosen choice and the best choice.

The determination of the best weighted execution trace uses a beam search, particle filtering, A*, or other related technique with the current model parameters. This results in an output of a set of collections of weighted execution traces for the example, where the weights are the sum of the aggregated scores from each decision and from each error function computation, where each step in the trace contains a set of "decisions" the system has to make (decisions include parses, plans, generated text, etc), and where each decision is a collection of vectors describing the features used associated with making the choice along with the actually chosen choice (this is similar to http://www.aclweb.org/anthology/N10-1083)

In the approach based on a generative probabilistic model formulation, the goal of learning is to maximize the probability of the outputs conditioned on the inputs. One model to use is a Hidden Markov Model (HMM), which fragments the timeline of the log into a sequence of time steps. At each time step, the system generates the events in the outputs that occur at the time of the event conditioned on the inputs at that time (and, optionally, up to that time). For durative events, one can model just the beginning time or the ending time or model the event as occurring repeatedly in the time span in which it is in. (Alternatively, a Hidden Semi-Markov Model could be used, predicting the beginning and ending time of the events rather than single points in time.)

For the hidden backbone of the HMM, the state of the system is precisely the state of the dialogue manager: the salience list and cards. The transition model for the HMM is simply the dialogue manager itself: parsing utterances from the speech recognizer output for user utterance and reacting to phone events. The HMM "generates" the events at each time step using the dialogue manager's state. The event types include output generated by the system, annotations generated from the dialog state, and application event.

Note that the text generator produces a distribution over utterances, and the model is trained to maximize the probability of the observed utterance under that distribution. Moreover, the distribution actually used to compute the likelihood of the observed utterance need not be exactly the same as the one output by the Generator. It could instead be a function of the text generator output. In particular, the distribution used for the likelihood computation could be made more robust to disfluencies or speech recognition artifacts by, for example, using an edit distance transducer that allows for inserted "uhs," etc. In the described embodiment, an edit distance transducer over words with automatically estimated parameters is used (estimated via EM).

The form of the distribution that generates the clickstream events could be as simple as a card-specific multinomial distribution over event types. An approach that is more likely to be successful is to use a structured distribution over event types, to learn the commonalities between, for example, events like "mark the first email as unread" and "delete the third email". In addition, some events may be best explained by a "noise" distribution: agents may make accidental stray clicks or the webpage may be updated by some automatic background process (for instance, a new advertisement may appear). In the described embodiment, the training system uses a mixture distribution between a background "noise" distribution and a feature-rich log linear model with features on both the action and on the conditioning environment (i.e. the cards). The parameters for this distribution are estimated jointly with the rest of the system.

Virtually every component of the system can be trained using this approach. The text generator learns from the descriptions and the agent's speech. The dialog manager and the semantic parser learn by predicting cards whose distributions generate the correct clickstream events and the correct "saying" and "generating" events.

As noted above, one characteristic of the training procedures described above is that much of the data that is recorded is self-annotated in a human or mixed human/automatic data collection mode. That is, the utterances of the user and those of the human agent, along with the record of the actions of the agent, are augmented with meta-data. This rich data is used as an input to various machine learning processes to improve system performance, to discover new paths to automation, to customize information-retrieval tasks, and to categorize dialog processes. Several examples follow.

Audio data from the user is automatically recognized with a speech recognition system. It is then parsed with a semantic parser, and passed to an agent (whether human or machine) for action. Actions may be to deliver data back to the user; to ask for clarification of some part of the information needed to pursue a task, or to inform the user of any problems.

Both the semantic parser and the automatic speech recognition system may be statistical machines—that is, they produce results as a result of computing the probability of particular outcomes, and the result(s) are created along with the probability of the correctness of those result(s). Results may be correct or incorrect, and this status is judged by either the actions of the user when receiving information, or by the action of the human assistant when acting on the incoming speech from the user. However it is obtained, the correctness of the speech recognition and of the semantic parse may be used as input to a machine learning algorithm to adjust the system so that it will create more "correct" outputs and it will minimize "incorrect" outputs. The ASR results, the semantic parse outputs, the actions of the agent, and the correctness measurements are all "annotations" of the user input sentence.

The user utterances have metadata from the device being used as an input channel. A cell phone has geo-location measures, velocity data, acceleration data, temperature measurements, altitude measure, ambient noise measurement, cell phone identity, phone number, and other indicators which are delivered to the network during a phone call. These data may be used as meta-data for utterances, indicating for instance what the likely accent or language of the speaker is, whether the user is busy dealing with traffic, or other identifying characteristic. They may also be used as raw input to a machine learning algorithm which can adjust the probability of a particular response in the presence of certain variables (for instance, a query about gun shows is less likely in Massachusetts than in Mississippi).

At a coarser level, a "card" in the current system defines everything that must be done to complete a task. Cards refer to other sub-elements; for instance a "write an email" card has sub-elements for defining to:, from:, subject: and text: fields. A machine learning algorithm might learn that for a particular user, the value of to:the white house, from:this particular user, subject:voting rights, that the speech recognizer should be biased towards positive rather than negative words. In this case, the values of the sub-cards so far are meta-data for the card itself, and may be used to optimize the performance of the system to complete the card.

Of course, the metadata may also be used as composite annotation. All of the speech recognition text material may be used to optimize the speech recognizer. In addition to making the actual text more probable, such training can attempt to identify unknown words (not in the speech recognition lexicon) and to add them to the speech recognition knowledge base.

Tracking the activities associated with cards over the entire population of users will allow better predictions of the next step to be completed given the previous steps. This type of prediction can provide more likely guidance to the human agent and, if highly predictable, may allow automation of system activities which were previously done by the human assistant.

The rich set of activities and annotations provided by the Attentive Assistant system will change over time, as conditions and user populations change, as the world continues to evolve, and as the system itself learns how to optimize the interaction between users and the assistant. The complete recording of the data for each interaction allows any particular data element to be treated as annotation.

The system shown in FIG. 1 may be used in various contexts, including for providing communication assistance to a user. For example, the external integration section 110 may include a component that integrates a telephone system, whereby events related to receiving telephone calls may initiate a dialog with a user related to the handling of a received call. Another context for use of the system is in automated telephone response to telephone orders or inquiries, for example, with a user calling the system, with a telephone voice interaction between processed by the system via the speech integration component, which is coupled to the telephone system. In many contexts, the application integration components may interface with web-based services in order to obtain information or cause actions (e.g., pizza orders) on behalf of the user.

Implementations of the system may use software that includes instructions (stored on non-transitory machine-readable media) that control one or more computers. For example, the functions illustrated in FIG. 1 may be executed on a single computer, or may be partitioned and executed on multiple computers that communicate, for example, over data networks. In some multiple-computer implementations, certain components may be hosted at a computer or other computing device at the user's location (e.g., a speech integration component) while other components may be hosted on server computers at one or more locations remote from the user. The functions of training described above may be hosted on yet other computer, which do are not necessarily involved in conducting dialogs involving the user. Although described in the context of a single user, it should be understood that a system may be configured to support multiple users and multiple dialogs concurrently, maintaining suitable separation to effectively operate dialogs independently. Some systems may support interaction with multiple users in a single dialog.

It is to be understood that the foregoing description is intended to illustrate and not to limit the scope of the invention, which is defined by the scope of the appended claims. Other embodiments are within the scope of the following claims.

What is claimed is:

1. An interaction system comprising:
an integration section including a first integration component for providing a linguistic interface to a user;
an event processing section including a parser for processing linguistic events from the first integration component; and
a dialog manager configured to receive alternative outputs from the event processing section, and selecting an action and causing the action to be performed based on the received alternative outputs;
wherein the system further includes a storage for a dialog state for an interaction with the user, and wherein the alternative outputs from the event processing section represent alternative transitions from a current dialog state to a next dialog state; and
wherein the system further includes a storage for a plurality of templates, and wherein each dialog state is defined in terms of an interrelationship of one or more instances of the templates.

2. The system of claim 1 wherein the parser is configured to process a linguistic input according to a current dialog state and the plurality of templates to determine the alternative outputs.

3. The system of claim 2 wherein each template defines a plurality of input fields and an output computable from the input fields.

4. The system of claim 3 wherein each template specifies a plurality of actions.

5. The system of claim 2 wherein the parser is further configured to determine each alternative output as a modification of the current dialog state.

6. The system of claim 5 wherein the modification of the current dialog state represents at least one of (a) a change in interrelationship of instances of templates of the current dialog state, (b) addition or removal of an instance of a template, and (c) setting of an input field value of an instance of a template.

7. The system of claim 2 wherein at least some of the alternative outputs are each associated with one or more actions, and the dialog manager is configured to select actions according to the alternative outputs.

8. The system of claim 1 wherein the first integration component includes an automatic speech recognizer configured to receive speech input from the user, and to determine text-based linguistic events for the parser.

9. The system of claim 1 wherein the integration section further includes an application integration component for providing an interface to external applications, and for providing application related events to the event processing section.

10. The system of claim 9 wherein the application related events include at least one of a user interface event, a communication event, and a data access event.

11. The system of claim 1 further includes a storage for salient information, the system being configured to update the salient information according to processing of event received by the event processing section, wherein the parser is configured to process a linguistic input using salience information determined from prior events processed by the event processing section.

12. The system of claim 1 wherein the dialog manager includes a machine learning component for selecting an action according to the alternative outputs.

13. An interaction system comprising:
an integration section including an integration component for providing a linguistic interface to a user;
an event processing section including a parser for processing linguistic events from the integration component; and
a dialog manager configured to receive alternative outputs from the event processing section, and selecting an action and causing the action to be performed based on the received alternative outputs;
wherein the system further includes a storage for a dialog state for an interaction with the user, and wherein the alternative outputs from the event processing section represent alternative transitions from a current dialog state to a next dialog state; and
wherein the system further includes a storage for a plurality of templates, and wherein each dialog state is defined by a graph of templates including: a root template having one or more inputs, and one or more child templates, each child template having an output connected via a directed link to an input of the root template.

14. The system of claim 13, wherein the parser is configured to process a linguistic input according to a current dialog state and the plurality of templates to determine the alternative outputs.

15. The system of claim 14, wherein the parser is further configured to determine each alternative output as a modification of the current dialog state.

16. The system of claim 15 wherein the modification of the current dialog state represents at least one of (a) a change in interrelationship of instances of templates of the current dialog state, (b) addition or removal of an instance of a template, and (c) setting of an input field value of an instance of a template.

17. A method for interacting with a user via dialog, the method comprising:
operating an integration component to provide a linguistic interface to the user;
operating a parser to process linguistic events from the integration component;
operating a dialog manager configured to:
receive alternative outputs from the parser, and
select an action and cause the action to be performed based on the received alternative outputs;
maintaining a plurality of templates and a dialog state for an interaction with the user, wherein the dialog state is defined by a graph of templates including: a root template having one or more inputs, and one or more child templates, each child template having an output connected via a directed link to an input of the root template; and
transforming a current dialog state to a next dialog state by selecting an alternative transition from the current dialog state to the next dialog state, based on the alternative outputs from the parser.

18. The system of claim 17, wherein the parser is configured to process a linguistic input according to a current dialog state and the plurality of templates to determine the alternative outputs.

19. The system of claim 18, wherein the parser is further configured to determine each alternative output as a modification of the current dialog state.

20. The system of claim 19 wherein the modification of the current dialog state represents at least one of (a) a change in interrelationship of instances of templates of the current dialog state, (b) addition or removal of an instance of a template, and (c) setting of an input field value of an instance of a template.

* * * * *